Feb. 23, 1943.   C. D. RICHARDSON ET AL   2,311,870
APPARATUS FOR AND METHOD OF PRODUCING MINERAL WOOL
Filed Aug. 11, 1939

INVENTORS:
CHARLES D. RICHARDSON,
DAVID W. BURNETT,
BY Bruce S. Elliott
ATTORNEY.

Patented Feb. 23, 1943

2,311,870

UNITED STATES PATENT OFFICE 2,311,870

APPARATUS FOR AND METHOD OF PRODUCING MINERAL WOOL

Charles D. Richardson and David W. Burnett, Alexandria, Ind., assignors to National Gypsum Company, Buffalo, N. Y., a corporation of Delaware Application August 11, 1939, Serial No. 289,636

7 Claims. (Cl. 49—1)

This invention relates to the art of manufacturing mineral wool, and is characterized, more particularly, by a novel method of controlling the character of the mineral substance from which the mineral wool is blown, both with respect to the composition of the mineral substance and its temperature at and previous to its formation into mineral wool fibers.

The invention is also concerned with a novel arrangement and operation of apparatus which makes it possible for us to practice our novel method and to produce a great improvement in the character of the mineral wool manufactured. This improvement is largely due to the fact that our invention enables us to control the character of the raw material, either rock, or slag, used in the production of the mineral wool, in such manner that the molten material which is blown to form the mineral wool fibers will be substantially uniform in quality and its temperature maintained at a given degree at all times, so that a very high degree of uniformity in the character of the resultant mineral wool fibers is obtained.

In the manufacture of mineral wool, rock or slag material in solid form, together with coke are introduced into a furnace where melting of the rock or slag takes place by means of the heat generated from the coke burning in the furnace. As the rock melts, it flows from a port near the bottom of the furnace, the molten stream as it issues from the port being shredded by a blast of steam which projects the molten particles at high velocity through the air in an enclosed chamber, during which movement the particles dissipate in the form of fibers.

Not all rock or slag materials, however, have the proper chemical composition to permit of their being formed into fibers by the process described and very few, if any, natural rock deposits or slag accumulations possess the proper composition which permits of their being formed into mineral wool having desired chemical and physical characteristics which impart to the wool the quality desired. Accordingly, in order to obtain a molten material of proper characteristics for blowing into fibers, it is present practice to use a mixture of rocks, slags, or minerals, each having substantially different chemical composition, and these different materials being introduced into the melting furnace in solid form.

This method of obtaining a molten substance suitable for blowing has the particular disadvantage that since none of the different materials used are alike chemically, their melting temperatures are not at the same point; thus there is not obtained in the furnace a uniform mixture of the different raw materials used and as a result the molten stream as it issues from the furnace is not constant in its composition due to the fact that at one time the melt from one of the minerals charged will flow out while the melt from another of the minerals charged may not yet have reached the molten state.

Again, the conventional method of producing mineral wool described above, in which the molten material as discharged from the furnace is immediately shredded by means of a steam blast, such method possesses the disadvantage that the only control which can influence the temperature of the molten stream at the time of discharge and subsequent blowing, is through control of conditions within the furnace itself. To obtain such control within the furnace which will effect any degree of regulation of the temperature of the discharging molten stream is very difficult, and has not been accomplished in practice to an extent to avoid a variation in the temperature of the molten stream within comparatively wide limits.

With our invention the foregoing disadvantages are overcome through the employment of methods and equipment to be later described. The control of the chemical composition of the molten material to be transformed into mineral fibers is accomplished by one or the other of two methods which are the essence of our invention. The first of these methods involves the use of two or more furnaces each producing a molten substance derived from a particular raw material or combination of raw materials, and each discharging its raw material in a molten state in such manner that the separate streams unite at a common point or within a common region outside the furnaces where mixing of the molten discharge from each of the furnaces is effected. This union of the separate molten streams may take place by direct contact one with the other immediately beyond the points of discharge from the respective furnaces, or the union may take place within a trough-like receptacle, or an auxiliary receiving chamber, or vessel, into which each of the furnaces discharges its product, the mixture in this chamber to be continuously withdrawn and subsequently blown into fibers.

The second of our methods involves the use of one or more furnaces producing a molten substance derived from a particular rock, or combination of rocks, the one or more furnaces then discharging the molten product into an auxiliary chamber into which also is introduced by suitable means a fluxing or combining material in solid form; mixing or uniting of the molten and solid materials being effected within the auxiliary mixing chamber or at the point of entry thereto, and the mixture then withdrawn from this chamber and subsequently blown into fibrous form.

With respect to a means of controlling the temperature of the molten substances prior to and at the time of being blown into fibrous form, it is also a part of this invention that any collecting or receiving vessel, or auxiliary chamber, into which molten material from one or more furnaces is discharged, or into which molten material and solid material is discharged, is supplied with a means of heating the material contained therein. By such application of heat, regulated in quantity by suitable controlling devices, the material contained in the receptacle may be slightly, or greatly, increased in temperature to a reasonably constant predetermined degree. Such an application of heat may also be required to establish proper temperature conditions for melting any solid material which may be introduced into the auxiliary chamber.

The invention is illustrated in the accompanying drawing in which—

Figure 1:
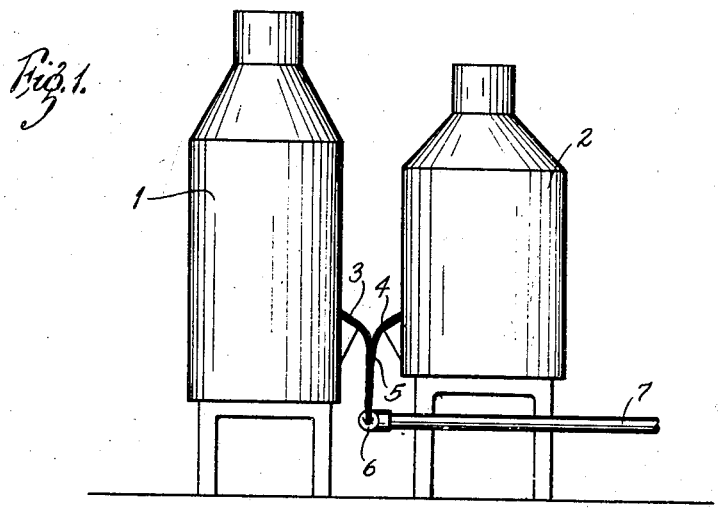
Figure 1 is an elevational view showing a simple form of our invention.

Referring now to Figure 1, the numerals 1 and 2 indicate, respectively, two furnaces in which different raw materials are reduced to molten state, the molten products being discharged in streams 3 and 4, respectively, which are directed to come together at a common point 5 exterior to the furnaces, the united streams thence flowing together as a single stream to the point of blowing, which is effected by a steam nozzle 6 connected to a steam supply line 7.

Figure 2:
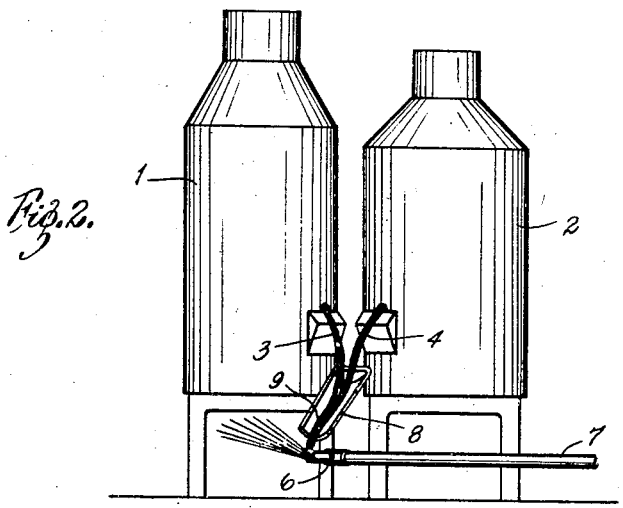
Figure 2 is a view similar to Figure 1 but showing a modified construction.

Figure 2 shows a modified form of the invention in which, as before, 1 and 2 are furnaces discharging streams of molten products 3 and 4, these streams being directed to pour on a common plate 8 preferably of trough-like shape, as shown, exterior to the furnaces, whereon the separate streams come together at a common point 9 thence to flow in a single united stream to the point of blowing, which, as before, is effected by a steam nozzle 6 connected to the steam supply line 7.

Figure 3:
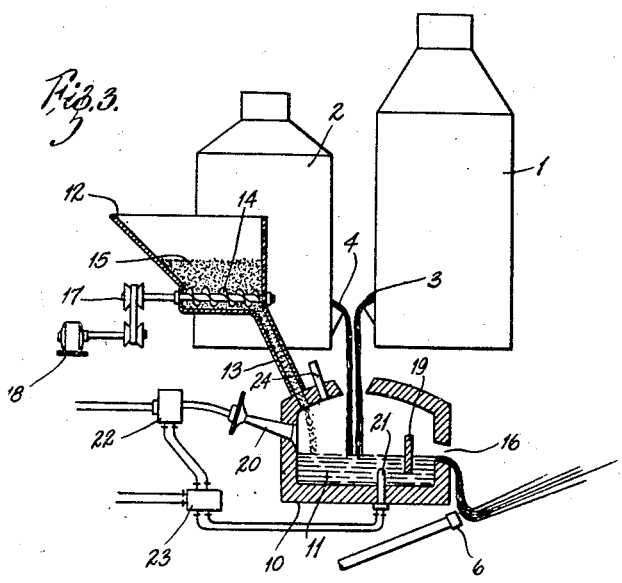
Figure 3 is a view partly in elevation and partly in section showing a further modified construction, the view being somewhat diagrammatic in character.

Referring now to Figure 3, the numerals 1 and 2 indicate as before, two furnaces discharging their molten products in streams 3 and 4 which in this case however, pour into an auxiliary vessel creating a molten bath 11 comprised of a mixture of the products of the two furnaces. The numeral 12 indicates a container for solid material, the interior of which is openly connected with the interior of the auxiliary vessel 10 by an inclined conduit 13. The container 12 is fitted with a screw conveyor 14 connected with an adjustable source of power 17 and 18 by which solid material 15 within the container may be fed at a predetermined rate into the conduit 13 thence to the interior of the auxiliary vessel 10 where it will become mixed in the bath 11 contained therein, fusion of the solid material being effected as a result of the presence of excess heat contained within the bath and supplied to the bath by means hereinafter described. The numeral 16 indicates a port in the auxiliary vessel from which the mixture of molten materials is allowed to discharge and flow to the point of blowing, which as before is effected by a steam nozzle 6.

Mounted within the auxiliary vessel 10 is a baffle 19 which is interposed between the discharge port 16 and the region where the molten streams of the furnaces and the solid material from container 12 enter the bath, the purpose of this baffle being to direct the movement of material within the vessel 10 so as to effect a uniformity of mixture of material reaching the discharge port.

The numeral 20 indicates a conventional gas burner directing a supply of heat into the auxiliary vessel 10 for the purpose of elevating the temperature of the contents therein, and the quantity of which may be automatically controlled by means of suitable conventional regulating devices consisting, in this case, of a temperature sensitive element 21 so situated as to be responsive to changes of temperature of the bath within the mixing chamber 10 and connected to complementary automatic control devices 22 and 23 so that the quantity of fuel or heat energy supplied to the burner for the generation of heat within the mixing chamber 10 is increased or decreased as determined by the temperature control device 19, thus regulating the amount of heat added to the bath in a manner which serves to control the temperature of the bath, the object being to hold this temperature constantly at a predetermined level within the variations consistent with such method of practice. A vent 24 is provided to permit escape of the products of combustion emanating from the supply of heat introduced into the auxiliary vessel 10.

We will now give a typical example of the use of the two furnaces 1 and 2 in melting two different minerals and combining the molten products flowing from the two furnaces in either of the three ways illustrated in the drawing.

Let us assume that furnace 1 is supplied with raw material having ingredients in the proportions indicated in analysis No. 1 below; and that furnace 2 contains raw material having ingredients in the percentages indicated in analysis No. 2 below. The two batches compare as follows:

|  | No. 1 | No. 2 |
| --- | --- | --- |
|  | Per cent | Per cent |
| Silica | 40 | 29 |
| Alumina | 12 | 15 |
| Lime | 27 | 23 |
| Magnesia | 15 | None |
| Iron oxide | None | 25 |
| Other minor constituents | 6 | 8 |

By examining these two analyses it will be seen that, in a general way, each bath supplements ingredients of the other batch, and one batch may supply an ingredient wholly lacking in the other. Thus, the raw material in furnace No. 1 is shown to contain 25% of iron oxide. Again, the raw material in furnace 2 contains no magnesia while that in furnace 1 contains 15% of magnesia. By thus controlling the ingredients, and the percentages thereof which ultimately comprise the molten material which is blown into mineral wool fibers, we are enabled to produce fibers having a character and homogeneity yielding a superior quality of fiber not possible to obtain by methods hitherto employed.

In Figure 3 we have illustrated means for adding a dry powdered fluxing agent to the molten product, or products, in an auxiliary mixing vessel. In this connection we contemplate the addition of such materials as boric oxide, zinc oxide, iron oxide and other substances which may or may not be present in the molten product received in the auxiliary mixing vessel from the furnace or furnaces, but the addition of which will result in a molten mixture capable of producing a mineral wool fiber superior to that which can be produced from products of the furnace, or furnaces alone.

For example, we can take a mineral similar to that represented by analysis No. 1 above but having less lime, and supply the lime deficiency by adding lime in powdered form in the auxiliary mixing vessel, or we can replace the lime deficiency with iron oxide added in powdered form in the auxiliary mixing vessel to form a composition which will produce mineral fibers of different and desirable character.

We claim:

1. In the art of producing mineral wool, the method which consists in separately melting two minerals having different predetermined chemical compositions, flowing a molten stream of each, combining said streams to effect a combination of the materials of the two streams, and blowing a molten stream of the combined materials into mineral wool fibers.

2. In the art of producing mineral wool, the method which consists in separately melting two minerals having different predetermined chemical compositions, flowing a molten stream of each, combining said streams into a single stream to effect a combination of the materials of the two streams, and subjecting the single stream to a shredding blast to produce mineral wool fibers.

3. In the art of producing mineral wool, the method which consists in separately melting two minerals having different predetermined chemical compositions, flowing a separate stream of each into a common receptacle to produce a composite material having desired chemical characteristics, flowing a stream of the molten composite material from said receptacle, and subjecting said last mentioned stream to a shredding blast to produce mineral wool fibers.

4. In the art of producing mineral wool, the method which consists in separately melting two minerals having respectively, compositions which mutually supplement each other in producing a desirable material for the production of mineral wool, flowing a molten stream of each mineral, combining the materials of the two streams and blowing mineral wool fibers from a molten stream of the combined materials.

5. In the art of producing mineral wool, the method which consists in separately melting two minerals having different predetermined chemical compositions, flowing a molten stream of each into a mixing vessel to produce a composite material having desired chemical characteristics, heating the composite molten material in said vessel to a desired temperature, flowing a stream of the composite molten material from said vessel, and subjecting said last mentioned stream to a shredding blast to produce mineral wool fibers.

6. In the art of producing mineral wool, the method which consists in melting two minerals having different predetermined chemical compositions, flowing a molten stream of each into a common mixing vessel to produce a composite material having desired chemical characteristics, raising the temperature of the composite molten material in said vessel and automatically maintaining the same at a desired degree of temperature, causing the flow of a stream of the molten composite material from said vessel and subjecting said last mentioned stream to a shredding blast to produce mineral wool fibers.

7. Apparatus for producing mineral wool comprising two furnaces for melting two chemicals differing in composition, each of said furnaces having an outlet at its lower end for the flow of a stream of molten material therefrom, a mixing vessel positioned to receive said streams and form a body of molten material therein, a burner for maintaining the heat of the molten material in said mixing vessel at a desired degree, a temperature responsive device for regulating said burner, said vessel having an outlet for the flow of a stream of molten material therefrom, and a nozzle positioned to direct a shredding blast against said last mentioned stream.

CHARLES D. RICHARDSON.
DAVID W. BURNETT.

CERTIFICATE OF CORRECTION.

Patent No. 2,311,870.  February 23, 1943.

CHARLES D. RICHARDSON, ET AL.

It is hereby certified that error appears in the printed specification of the above numbered patent requiring correction as follows: Page 3, second column, line 30, for "causing the flow of" read --flowing--; and that the said Letters Patent should be read with this correction therein that the same may conform to the record of the case in the Patent Office.

Signed and sealed this 13th day of April, A. D. 1943.

(Seal)

Henry Van Arsdale,
Acting Commissioner of Patents.